(12) United States Patent
Iwata et al.

(10) Patent No.: US 11,209,225 B2
(45) Date of Patent: Dec. 28, 2021

(54) HEAT EXCHANGER, RADIANT TUBE TYPE HEATING DEVICE, AND METHOD OF MANUFACTURING HEAT EXCHANGER

(71) Applicant: JFE Steel Corporation, Tokyo (JP)

(72) Inventors: Koji Iwata, Tokyo (JP); Kazuaki Hara, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 216 days.

(21) Appl. No.: 16/337,109

(22) PCT Filed: Aug. 22, 2017

(86) PCT No.: PCT/JP2017/029965
§ 371 (c)(1),
(2) Date: Mar. 27, 2019

(87) PCT Pub. No.: WO2018/061531
PCT Pub. Date: Apr. 5, 2018

(65) Prior Publication Data
US 2019/0219346 A1 Jul. 18, 2019

(30) Foreign Application Priority Data

Sep. 29, 2016 (JP) .............................. JP2016-191748

(51) Int. Cl.
*F28F 13/12* (2006.01)
*F28D 1/04* (2006.01)
(Continued)

(52) U.S. Cl.
CPC ................ *F28F 13/12* (2013.01); *F23C 3/00* (2013.01); *F23D 14/12* (2013.01); *F23L 15/045* (2013.01);
(Continued)

(58) Field of Classification Search
CPC ... F28D 7/005; F28D 7/06; F28D 7/08; F28D 7/082; F28D 7/085; F28D 7/10;
(Continued)

(56) References Cited

U.S. PATENT DOCUMENTS 2,574,142 A * 11/1951 Buongirno ................ F28F 1/30
165/77
2,624,555 A * 1/1953 Di Vincenzo ........... B21C 37/24
165/77
(Continued)

FOREIGN PATENT DOCUMENTS

CN 101793434 A 8/2010
CN 201582821 U 9/2010
(Continued)

OTHER PUBLICATIONS

JP-2011119517-A—English Machine translation (Year: 2011).*
(Continued)

*Primary Examiner* — Jianying C Atkisson
*Assistant Examiner* — Jose O Class-Quinones
(74) *Attorney, Agent, or Firm* — RatnerPrestia (57) ABSTRACT

A heat exchanger includes a hollow heat exchanger main body that is enclosed in a radiant tube, and a heat conductor that is disposed on outer periphery of the heat exchanger main body. The heat exchanger performs heat exchange between a first gas flowing in between the radiant tube and the heat exchanger main body and a second gas flowing in hollow interior of the heat exchanger main body, and the heat exchanger comprises a turbulence flow generation promoting unit configured to promote generation of a turbulence flow from the first gas flowing in between the radiant tube and the heat exchanger main body, the turbu-
(Continued)

lence flow generation promoting unit being disposed on the outer periphery of the heat exchanger main body without welding.

16 Claims, 6 Drawing Sheets (51) Int. Cl.
F23L 15/04 (2006.01)
F23D 14/12 (2006.01)
F23C 3/00 (2006.01)
F28D 21/00 (2006.01)

(52) U.S. Cl.
CPC ....... *F28D 1/0408* (2013.01); *F28D 21/0014* (2013.01); *Y02E 20/34* (2013.01)

(58) Field of Classification Search
CPC ........ F28D 7/106; F28D 7/12; F28D 21/0003; F28D 21/0005; F28D 21/0008; F28F 1/24; F28F 1/26; F28F 1/30; F28F 1/34; F28F 1/38; F28F 9/24; F28F 9/026; F28F 9/0265; F28F 9/0268; F28F 9/028; F28F 13/02; F28F 13/06; F28F 13/12; F28F 2275/08; F28F 2275/088; F28F 2275/14; F28F 2275/143; F28F 2275/146; F28F 2275/20; F28F 2280/02; F28F 2280/105; F23L 15/04; F23L 15/045; F23C 3/002; F23C 7/04; F23C 7/06; F23C 2900/03004; F23M 9/003
See application file for complete search history.

(56) References Cited

U.S. PATENT DOCUMENTS

| | | | | |
|---|---|---|---|---|
| 2,699,923 A * | 1/1955 | Walworth | ............... | F28D 1/053 165/76 |
| 2,726,850 A * | 12/1955 | Buongirno | ............... | F28F 1/30 165/77 |
| 2,739,213 A * | 3/1956 | Beckjord | ............... | H05B 3/50 219/540 |
| 3,672,446 A * | 6/1972 | Tibbetts | ............... | F25B 39/02 165/183 |
| 4,170,260 A * | 10/1979 | Rudd | ............... | F01N 13/1805 123/41.69 |
| 4,184,544 A * | 1/1980 | Ullmer | ............... | F24B 7/005 165/184 |
| 4,244,098 A * | 1/1981 | Barcus | ............... | F28F 1/20 165/183 |
| 4,351,389 A * | 9/1982 | Guarnaschelli | ............... | F28F 1/34 165/141 |
| 4,467,779 A * | 8/1984 | Kreinin | ............... | F23C 3/002 126/91 A |
| 4,487,256 A * | 12/1984 | Lutjens | ............... | F28F 1/20 165/183 |
| 4,557,249 A * | 12/1985 | Sweedyk | ............... | F24H 3/087 126/11 OR |
| 4,589,844 A | 5/1986 | Loukas et al. | | |
| 4,753,219 A * | 6/1988 | Caferro | ............... | F24B 7/005 126/307 R |
| 4,771,825 A * | 9/1988 | Chen | ............... | F28F 1/30 165/151 |
| 4,794,980 A * | 1/1989 | Raisanen | ............... | F28F 21/084 165/54 |
| 4,800,866 A * | 1/1989 | Finke | ............... | F23L 15/04 126/91 A |
| 4,809,415 A * | 3/1989 | Okayama | ............... | B21C 37/083 165/133 |
| 4,873,127 A * | 10/1989 | Onodera | ............... | B23K 1/0012 427/376.8 |
| 4,894,006 A | 1/1990 | Cassagne et al. | | |
| 4,951,742 A * | 8/1990 | Keyes | ............... | F28F 1/36 165/184 |
| 5,309,982 A * | 5/1994 | Aliano | ............... | F28F 1/30 165/181 |
| 5,775,317 A * | 7/1998 | Finke | ............... | F23C 9/00 126/91 A |
| 6,029,647 A | 2/2000 | Pisano et al. | | |
| 6,190,159 B1 * | 2/2001 | Moore | ............... | F23L 15/04 431/11 |
| 6,808,017 B1 * | 10/2004 | Kaellis | ............... | F28F 1/34 165/109.1 |
| 7,010,889 B1 * | 3/2006 | Renfro | ............... | F16L 3/1091 138/106 |
| 7,128,139 B2 * | 10/2006 | Oballa | ............... | C10G 9/20 165/181 |
| 7,343,753 B2 * | 3/2008 | Kidwell | ............... | F28D 7/12 62/260 |
| 8,910,881 B2 * | 12/2014 | Ludwig | ............... | F24H 3/065 237/12.3 A |
| 9,360,163 B2 * | 6/2016 | DeVarney | ............. | F17C 13/084 |
| 9,833,762 B2 * | 12/2017 | He | ............. | C10G 9/20 |
| 2005/0056407 A1 * | 3/2005 | Oh | ............. | F28F 1/32 165/151 |
| 2009/0127407 A1 * | 5/2009 | Pothanikat | ............. | F16L 59/135 248/74.1 |
| 2013/0118724 A1 | 5/2013 | Usui et al. | | |
| 2013/0157204 A1 * | 6/2013 | Hong | ............. | F23C 3/002 431/8 |
| 2014/0020880 A1 * | 1/2014 | Fanberg | ............. | B23P 15/26 165/185 |
| 2014/0215825 A1 * | 8/2014 | Furukawa | ............. | B21C 37/26 29/890.046 |
| 2015/0000881 A1 * | 1/2015 | Tamura | ............. | F28F 13/185 165/157 |
| 2015/0219398 A1 * | 8/2015 | Santoro | ............. | F04D 19/024 62/314 |
| 2016/0091254 A1 * | 3/2016 | Kawamura | ............. | F28F 13/187 165/166 |

FOREIGN PATENT DOCUMENTS

| | | | | |
|---|---|---|---|---|
| CN | 102418936 A | 4/2012 | | |
| CN | 202350082 U | 7/2012 | | |
| CN | 103574632 A | 2/2014 | | |
| GB | 415609 A * | 8/1934 | ............ | F28F 21/085 |
| JP | S63163792 A | 7/1988 | | |
| JP | S6458907 A | 3/1989 | | |
| JP | 01219412 A | 9/1989 | | |
| JP | H07305833 A | 11/1995 | | |
| JP | 2002048334 A | 2/2002 | | |
| JP | 2003097803 A | 4/2003 | | |
| JP | 2008209058 A | 9/2008 | | |
| JP | 2011119517 A * | 6/2011 | | |
| JP | 2011163567 A | 8/2011 | | |
| JP | 2014092329 A | 5/2014 | | |
| JP | 201594578 A | 5/2015 | | |
| KR | 1020140126523 A | 10/2014 | | |

OTHER PUBLICATIONS

International Search Report and Written Opinion for International Application No. PCT/JP2017/029965, dated Oct. 17, 2017, 8 pages.
Korean Office For Korean Application No. 10-2019-7008397, dated Jul. 10, 2020 with Concise Statement of Relevance of Office Action, 6 pages.
Chinese Office Action for Chinese Application No. 201780058847.7, dated Aug. 20, 2020 with Concise Statement of Relevance of Office Action, 9 pages.
Chinese Office Action for Chinese Application No. 201780058847.7, dated Nov. 29, 2019, with Concise Statement of Relevance of Office Action, 11 pages.

\* cited by examiner

HEAT EXCHANGER MAIN BODY AXIS DIRECTION

FIG.3

HEAT EXCHANGER MAIN BODY AXIS DIRECTION

FIG.4 (PRIOR ART)

HEAT EXCHANGER MAIN BODY AXIS DIRECTION

HEAT EXCHANGER MAIN BODY AXIS DIRECTION

FIG.10

HEAT EXCHANGER MAIN BODY AXIS DIRECTION

HEAT EXCHANGER, RADIANT TUBE TYPE HEATING DEVICE, AND METHOD OF MANUFACTURING HEAT EXCHANGER

CROSS REFERENCE TO RELATED APPLICATIONS

This is the U.S. National Phase application of PCT/JP2017/029965, filed Aug. 22, 2017, which claims priority to Japanese Patent Application No. 2016-191748, filed Sep. 29, 2016, the disclosures of each of these, applications being incorporated herein by reference in their entireties for all purposes.

FIELD OF THE INVENTION

The present invention relates to a heat exchanger, a radiant tube type heating device, and a method of manufacturing a heat exchanger.

BACKGROUND OF THE INVENTION

Conventionally, as a heating unit used in a heat treat furnace that performs heat treating of metallic materials, a radiant tube type heating device is known in which a burner and a heat exchanger are disposed inside a radiant tube.

In a radiant tube type heating device disclosed in Patent Literature 1, a fuel gas and combustion air are supplied to a burner and the fuel gas is burnt, so that a combustion gas is generated inside the radiant tube thereby resulting in the heating of the radiant tube. Moreover, on the outer periphery of the main body of the heat exchanger, a spiral heat conductor is disposed. The exhaust gas that represents the combustion gas used in heating the radiant tube is guided along the outer periphery of the main body of the heat exchanger by the heat conductor, and passes in between the outer periphery of the main body of the heat exchanger and the inner periphery of the radiant tube. At that time, the heat of the exhaust gas gets absorbed in the outer periphery of the main body of the heat exchanger thereby resulting in the heating of the main body of the heat exchanger. Moreover, the heat of the exhaust gas gets absorbed in the heat conductor too, and the main body of the heat exchanger gets heated also because of the transfer of heat from the heat conductor. Due to the main body of the heat exchanger that gets heated in this manner, there occurs preheating of the combustion air that flows through the hollow interior of the main body of the heat exchanger and that is yet to be supplied to the burner. Subsequently, as a result of supplying the preheated combustion air to the burner, there is enhancement in the efficiency of combustion of the fuel gas in the burner.

PATENT LITERATURE

Patent Literature 1: Japanese Patent Application Laid-open No. 2014-92329

SUMMARY OF THE INVENTION

However, if the temperature difference between the main body of the heat exchanger and the heat conductor becomes too large, then thermal stress that is generated due to the difference in the thermal expansion of the main body of the heat exchanger and the heat conductor, which are in contact with each other, causes breakage of the heat conductor.

The present invention is made in view of the issues mentioned above, and it is an object to provide a heat exchanger, a radiant tube type heating device, and a method of manufacturing a heat exchanger that enable achieving reduction in the temperature difference between the main body of the heat exchanger and the heat conductors, and thus preventing breakage of the heat conductors.

To solve the above-described problem and achieve the object, a heat exchanger according to embodiments of the present invention includes: a hollow heat exchanger main body that is enclosed in a radiant tube; and a heat conductor that is disposed on outer periphery of the heat exchanger main body, wherein the heat exchanger performs heat exchange between a first gas flowing in between the radiant tube and the heat exchanger main body and a second gas flowing in hollow interior of the heat exchanger main body, and the heat exchanger comprises a turbulence flow generation promoting unit configured to promote generation of a turbulence flow from the first gas flowing in between the radiant tube and the heat exchanger main body, the turbulence flow generation promoting unit being disposed on the outer periphery of the heat exchanger main body without welding.

Moreover, in the above-described heat exchanger according to embodiments of the present invention, the heat conductor includes a plurality of circular heat conductors disposed at predetermined intervals in heat exchanger main body axis direction, and the heat conductor functions as the turbulence flow generation promoting unit.

Moreover, in the above-described heat exchanger according to embodiments of the present invention, each of the heat conductors includes a plurality of divided portions that are able to be divided in circumferential direction.

Moreover, in the above-described heat exchanger according to embodiments of the present invention, a cross-section of each of the heat conductors parallel to the heat exchanger main body axis direction has a columnar shape, a flat shape, or a semicircular shape.

Moreover, the above-described heat exchanger according to embodiments of the present invention further includes coupling units, each coupling unit being configured to couple end portions in circumferential direction of each of the plurality of divided portions.

Moreover, in the above-described heat exchanger according to embodiments of the present invention, height of the heat conductors from the outer periphery is smaller than distance between neighboring heat conductors along the heat exchanger main body axis direction.

Moreover, in the above-described heat exchanger according to embodiments of the present invention, relationship of $0.10 \leq (H/P)^{0.8} \cdot \{(A-Af)/A\} \leq 0.20$ is satisfied, where P [mm] represents distance between neighboring heat conductors along the heat exchanger main body axis direction, H [mm] represents height of the heat conductors from the outer periphery, A [mm$^2$] represents total heating area of the heat exchanger main body and the heat conductors, and Af [mm$^2$] represents heating area of the heat conductors.

Moreover, in the above-described heat exchanger according to embodiments of the present invention, the heat conductors are arranged to repeat an uneven pattern at certain height in heat exchanger main body axis direction.

Moreover, in the above-described heat exchanger according to embodiments of the present invention, the heat conductor includes circular members each having one end thereof kept open, the circular members being arranged at predetermined intervals along heat exchanger main body axis direction, and the heat conductor functions as the turbulence flow generation promoting unit.

Moreover, in the above-described heat exchanger according to embodiments of the present invention further includes an additional heat conductor including: a plurality of divided portions that are divided in circumferential direction; or a circular member having one end thereof kept open.

Moreover, in the above-described heat exchanger according to embodiments of the present invention, the heat conductor is made of a material having higher heat resistance than the heat exchanger main body.

Moreover, a radiant tube type heating device according to embodiments of the present invention includes a heat exchanging unit configured to perform heat exchange between a combustion gas, which is inserted in and flows inside a radiant tube, and combustion air used in heating the radiant tube, wherein the heat exchanging unit is the above-described heat exchanger according to the present invention.

Moreover, a method of manufacturing a heat exchanger according to embodiments of the present invention includes performing heat exchange with combustion air by using exhaust gas of a burner attached to a radiant tube, wherein on outer periphery of a hollow heat exchanger in which a heat conductor for promoting heat exchange is not disposed, the heat conductor including: a plurality of divided portions that are divided in circumferential direction; or a circular member having one end thereof kept open is disposed.

Moreover, in the above-described method of manufacturing a heat exchanger according to embodiments of the present invention, the heat conductor is arranged to repeat an uneven pattern at certain height in heat exchanger main body axis direction.

Moreover, a method of manufacturing a heat exchanger according to embodiments of the present invention includes performing heat exchange with combustion air using exhaust gas of a burner attached to a radiant tube, wherein in heat exchanger main body in which a heat conductor for promoting heat exchange is disposed, an additional heat conductor including: a plurality of divided portions that are divided in circumferential direction; or a circular member having one end thereof kept open is provided.

Moreover, in the above-described method of manufacturing a heat exchanger according to embodiments of the present invention, the heat conductor is arranged to repeat an uneven pattern at certain height in heat exchanger main body axis direction.

A heat exchanger, a radiant tube type heating device, and a method of manufacturing a heat exchanger according to embodiments of the present invention enable achieving reduction in the temperature difference between the main body of the heat exchanger and the heat conductors, and thus preventing breakage of the heat conductors.

DETAILED DESCRIPTION OF EMBODIMENTS OF THE INVENTION

Figure 1:
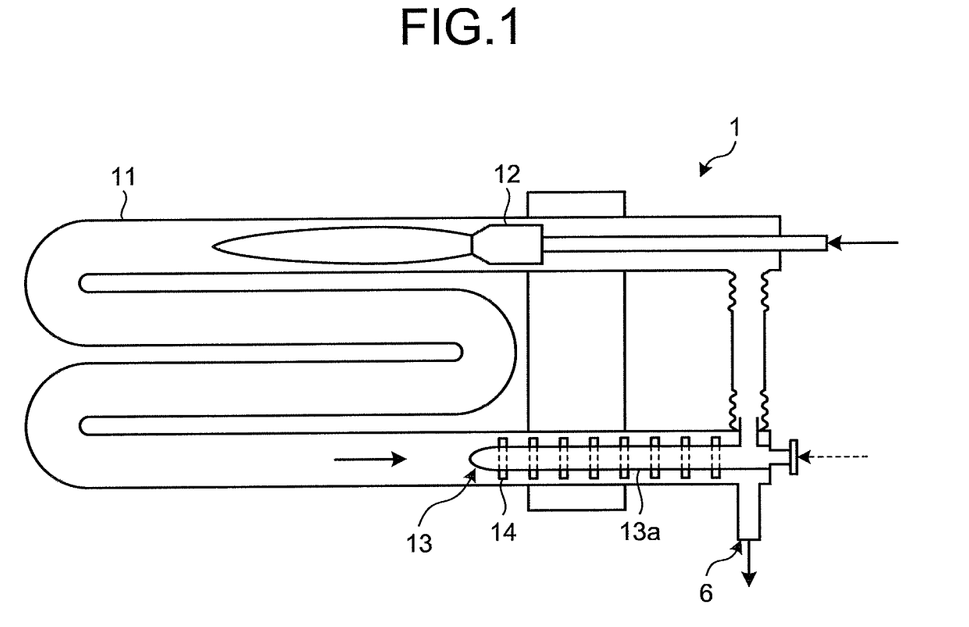
FIG. 1 is a schematic diagram illustrating a configuration of a radiant tube type heating device according to an embodiment.
Figure 2:
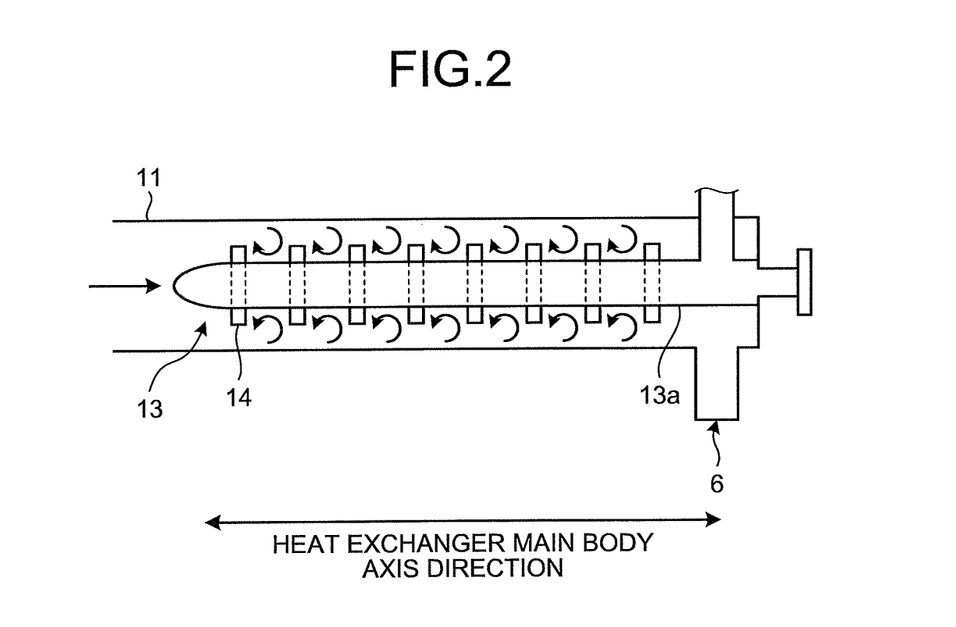
FIG. 2 is an enlarged view illustrating the portion near a heat exchanger in the radiant tube type heating device.

An exemplary embodiment of an heat exchanger according to the present embodiment and a radiant tube type heating device that includes the heat exchanger is described below with reference to the accompanying drawings. However, the present invention is not limited by the embodiment. FIG. 1 is a schematic diagram illustrating a configuration of a radiant tube type heating device 1 according to the embodiment. FIG. 2 is an enlarged view illustrating the portion near a heat exchanger 13 in the radiant tube type heating device 1. The radiant tube type heating device 1 includes a tubular radiant tube 11, and is meant for heating the radiant tube 11 from inside so that the radiant heat from the outer periphery of the radiant tube 11 results in the heating of a steel plate or steel stock.

The radiant tube 11 has a burner 12 inserted therein at one end. The burner 12 burns a fuel gas using combustion air to generate a combustion gas, and then uses the combustion gas flowing inside the radiant tube 11 to heat the radiant tube 11 from inside. Meanwhile, the radiant tube 11 has the heat exchanger 13 inserted therein at the other end. The heat exchanger 13 performs heat exchange between the combustion gas that was used in heating the radiant tube 11 (hereinafter, called the exhaust gas) and the combustion air supplied from outside, and supplies the heated combustion air to the burner 12.

On the outer periphery of a heat exchanger main body 13a that is hollow in nature, a plurality of circular fins 14 enclosing the heat exchanger main body 13a is arranged at predetermined intervals along the heat exchanger main body axis direction. In the present embodiment, with respect to the heat exchanger main body 13a, the fins 14 are arranged in such a way that the radial direction of the fins 14 is orthogonal to the heat exchanger main body axis direction. Alternatively, with respect to the heat exchanger main body 13a, the fins 14 can be arranged in such a way that the radial direction of the fins 14 is oblique with respect to the heat exchanger main body axis direction.

Figure 3:
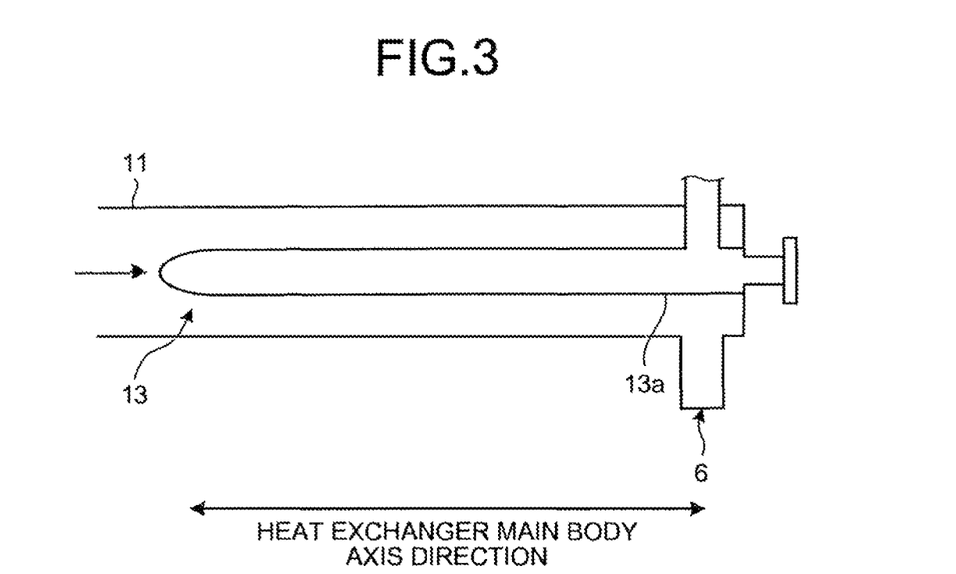
FIG. 3 is a diagram illustrating a heat exchanger main body of the heat exchanger not having heat conductors disposed therein.

In the heat exchanger 13 according to the present embodiment, on the outer periphery of the heat exchanger main body 13a having no heat conductor disposed thereon as illustrated in FIG. 3, the fins 14 are disposed without welding. As a result, it becomes possible to prevent any breakage attributed to the temperature difference between the heat exchanger main body 13a and the fins 14, and thus the heat transmission function of the fins can be retained for long periods.

When the exhaust gas passes in between the outer periphery of the heat exchanger main body 13a and the inner periphery of the radiant tube 11, the heat of the exhaust gas gets absorbed in the outer periphery of the heat exchanger main body 13a thereby resulting in the heating of the heat exchanger main body 13a. Moreover, the heat of the exhaust gas is absorbed by the fins 14, and then the heat gets transferred to the heat exchanger 13 thereby resulting in the heating of the heat exchanger 13. As a result, as compared to the case in which the fins 14 are not disposed on the outer periphery of the heat exchanger 13, it becomes possible to promote the transfer of heat from the exhaust gas to the heat exchanger 13, and to increase the amount of transferred heat to the heat exchanger 13. Then, due to the heat exchanger main body 13a in the heated state, there occurs preheating of the combustion air that flows through the hollow, interior of the heat exchanger main body 13a and that is yet to be supplied to the burner 12. Subsequently, as a result of supplying the preheated combustion air to the burner 12, there is enhancement in the efficiency of combustion of the fuel gas in the burner 12. That enables achieving reduction in the use rate of the fuel gas in the burner 12. In this way, in the heat exchanger 13 according to the embodiment, the fins 14 function as heat transfer promoting members for promoting the transfer of heat from the exhaust gas to the heat exchanger main body 13a.

Subsequently, the exhaust gas, which has passed in between the outer periphery of the heat exchanger main body 13a and the inner periphery of the radiant tube 11 and from which heat has been absorbed by the heat exchanger main body 13a and the fins 14, is then discharged from an exhaust port 6 provided in the radiant tube 11.

In the heat exchanger 13 according to the embodiment, in between the inner periphery of the radiant tube 11 and the heat exchanger main body 13a, the exhaust gas that flows parallel to the heat exchanger main body axis direction inside the radiant tube 11 collides against the fins 14 thereby resulting in the generation of a turbulence flow. In this way, in the heat exchanger 13 according to the embodiment, the fins 14 function also as a turbulence flow promoting members for promoting generation of a turbulence flow from the exhaust gas flowing in between the inner periphery of the radiant tube 11 and the outer periphery of the heat exchanger main body 13a.

Figure 4:
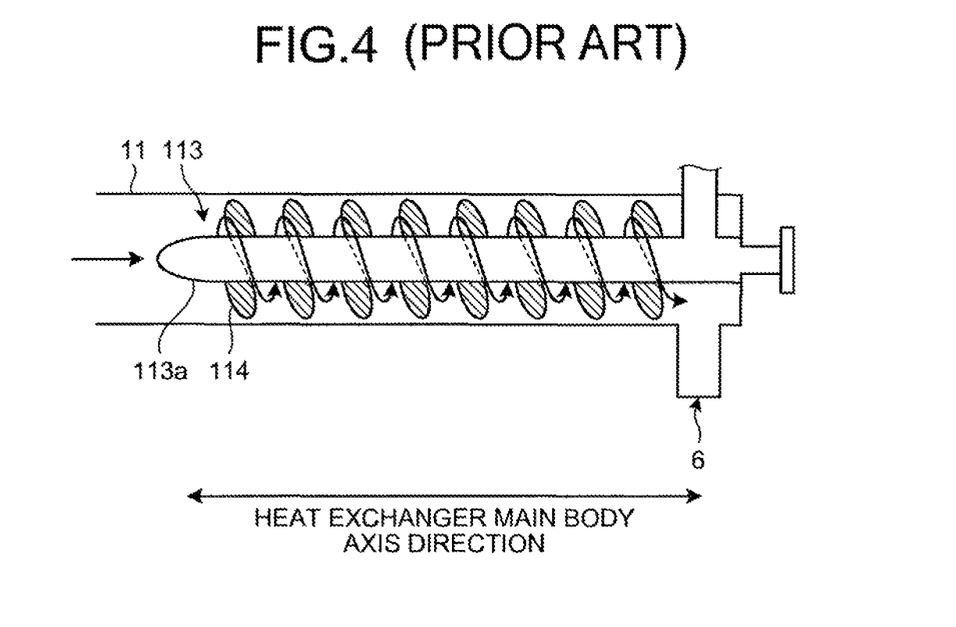
FIG. 4 is a schematic diagram illustrating a configuration of a heat exchanger according to a conventional example.

FIG. 4 is a schematic diagram illustrating a configuration of a heat exchanger 113 according to a conventional example. As illustrated in FIG. 4, in the heat exchanger 113 according to a conventional example, spiral fins 114 are disposed on the outer periphery of a heat exchanger main body 113a along the heat exchanger main body axis direction, and the exhaust gas passes in between the outer periphery of the heat exchanger main body 113a and the inner periphery of the radiant tube 11 along the outer periphery of the heat exchanger main body 113a while being guided by the spiral fins 114. Hence, although the spiral fins 114 cause a turbulence flow from the exhaust gas flowing in between the outer periphery of the heat exchanger main body 113a and the inner periphery of the radiant tube 11, there is only a small effect of the generation of the turbulence flow in the vicinity of the outer periphery of the heat exchanger main body 113a; and the low-temperature exhaust gas, which flows in the vicinity of the outer periphery of the heat exchanger main body 113a and from which heat has been absorbed in the heat exchanger main body 113a, is not actively replaced with the high-temperature exhaust gas that flows in the vicinity of the inner periphery of the radiant tube 11.

In contrast, in the heat exchanger 13 according to the embodiment, as described above, a turbulence flow is actively generated from the exhaust gas due to the fins 14. Consequently, in between the inner periphery of the radiant tube 11 and the outer periphery of the heat exchanger main body 13a, the low-temperature exhaust gas, which flows in the vicinity of the outer periphery of the heat exchanger main body 13a and from which heat has been absorbed in the heat exchanger main body 13a, is actively replaced with the high-temperature exhaust gas that flows in the vicinity of the inner periphery of the radiant tube 11. As a result, in between the inner periphery of the radiant tube 11 and the outer periphery of the heat exchanger main body 13a, as compared to the case in which the effect of the generation of the turbulence flow from the exhaust gas due to the fins 14 is small in the vicinity of the outer periphery of the heat exchanger main body 113a, the amount of heat transferred from the exhaust gas to the heat exchanger 13 can be increased. Accordingly, the temperature difference between the heat exchanger main body 13a and the fins 14 can be reduced, and the fins 14 can be prevented from any breakage attributed to the difference in the thermal expansion of the heat exchanger main body 13a and the fins 14. Moreover, as a result of preventing the breakage of the fins 14, it becomes possible to extend the life of the fins 14 and to hold down a decline occurring in the improvement effect of heat transfer from the exhaust gas to the heat exchanger main body 13a due to any breakage of the fins 14.

Figure 5:
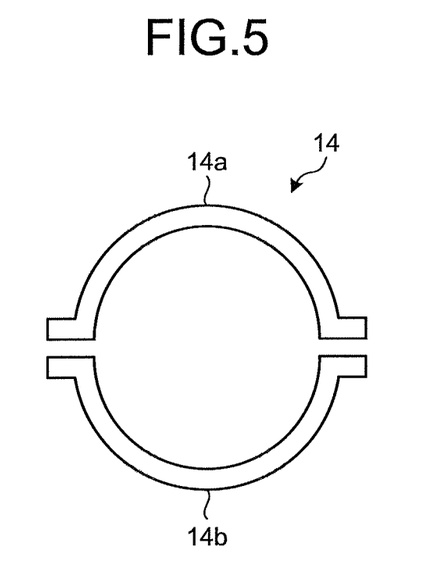
FIG. 5 is a schematic diagram illustrating an example of a fin disposed in the heat exchanger according to the embodiment.

FIG. 5 is a schematic diagram illustrating an example of the fin 14 disposed in the heat exchanger 13 according to the embodiment. The fin illustrated in FIG. 14 is made of an upper fin 14a and a lower fin 14b representing two divided portions formed in half in the circumferential direction. Meanwhile, the fin 14 can be divided into three or more portions in the circumferential direction. As a result of dividing the fin 14 into a plurality of portions in the circumferential direction, it becomes possible to enhance the workability of attaching and removing the fin 14 with respect to the heat exchanger main body 13a. Moreover, as a result of dividing the fin 14 into a plurality of portions in the circumferential direction, the generation of thermal stress due to thermal expansion can be held down, and the life of the fin 14 can be extended.

Figure 6:
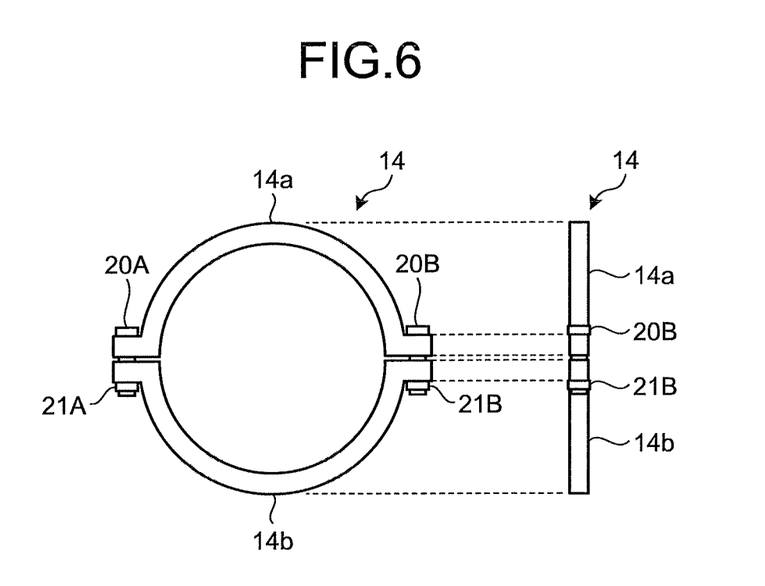
FIG. 6 is a diagram illustrating the state in which an upper fin and a lower fin are coupled at both ends thereof in the circumferential direction.

FIG. 6 is a diagram illustrating the state in which the upper fin 14a and the lower fin 14b are coupled at both ends thereof in the circumferential direction. As illustrated in FIG. 6, both ends in the circumferential direction of the upper fin 14a and the lower fin 14b are tightened and coupled using a pair of a bolt 20A and a nut 21A and using a pair of a bolt 20B and a nut 21B. As a result, according to the amount of tightening the bolts 20A and 20B, the stress generated due to the contact between the fin 14 and the heat exchanger main body 13a can be adjusted in advance in such a way that the stress generated due to mutual pressing by the heat exchanger 13 and the fin 14 as a result of thermal expansion does not become too large. Hence, it becomes possible to prevent a situation in which, when the heat exchanger 13 and the fin 14 undergo thermal expansion, the stress generated due to mutual pressing becomes too large thereby resulting in the breakage of the fin 14.

Herein, although tightening members such as the bolts 20A and 20B and the nuts 21A and 21B are used as the coupling members meant for coupling both ends in the circumferential direction of the upper fin 14a and the lower fin 14b, that is not the only possible case. Alternatively, for example, both ends in the circumferential direction of the upper fin 14a and the lower fin 14b can be coupled by sandwiching and fixing them using sandwiching members such as clips.

Moreover, in the heat exchanger 13 according to the embodiment, as illustrated in FIG. 2, the fins 14 have a columnar cross-section parallel to the heat exchanger main body axis direction. Alternatively, the cross-section of the fins 14 can be of a flat shape thinner than the columnar shape or can be of a semicircular shape.

Figure 7:
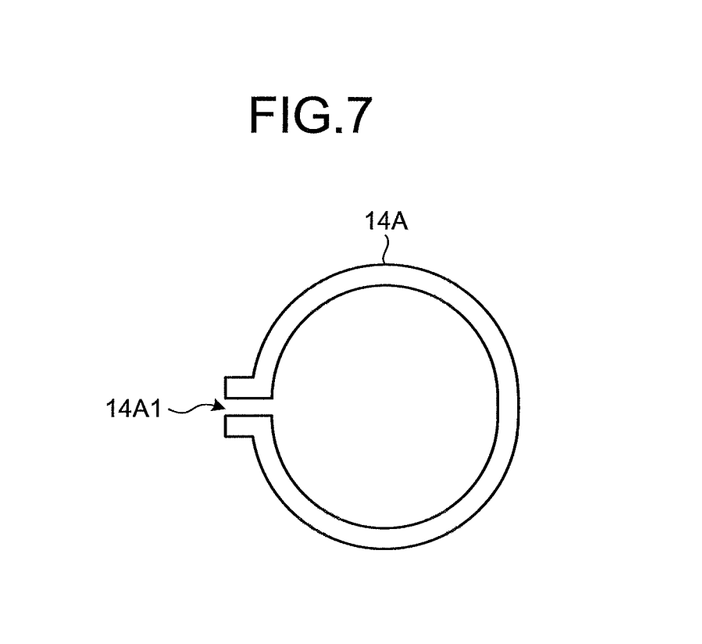
FIG. 7 is a schematic diagram illustrating an example of a heat conductor disposed in the heat exchanger according to the embodiment.

FIG. 7 is a schematic diagram illustrating an example of a heat conductor disposed in the heat exchanger 13 according to the embodiment. As the heat conductors disposed in the heat exchanger 13, a fin 14A can be used that is made of a circular member (a C-shaped member) having an end portion 14A1 kept open as illustrated in FIG. 7. In the fin 14A, as a result of keeping the end portion 14A1 open, it becomes possible to enhance the workability of attaching and removing the fin 14A with respect to the heat exchanger main body 13a not having any heat conductors disposed therein as illustrated in FIG. 3. Moreover, as a result of keeping the end portion 14A1 of the fin 14A open, the generation of thermal stress due to thermal expansion can be held down, and the life of the fin 14A can be extended.

As the material used in the fins 14 or the fins 14A, it is desirable to use a material having a higher degree of heat resistance than the material used in the heat exchanger main body 13a. In the present embodiment, heat-resistant cast steel is used in the heat exchanger main body 13a; and a heat-resistant material having a higher degree of Ni ratio and a higher degree of heat resistance than the heat-resistant cast steel, which is used in the heat exchanger main body 13a, is used in the fins 14 or the fins 14A. As a result, it becomes possible to extend the life of the fins 14 or the fins 14A that reach a higher temperature than the heat exchanger main body 13a, and to further hold down a decline occurring in the heat-transfer efficiency due to any breakage of the fins 14 or the fins 14A.

Figure 8:
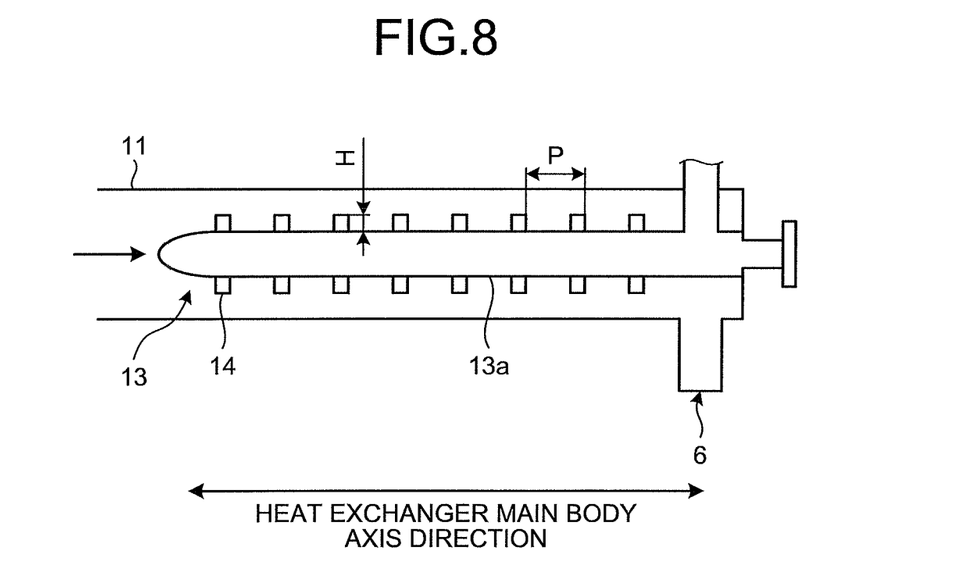
FIG. 8 is an explanatory diagram for explaining the pitch and the height of the fins in the heat exchanger according to the embodiment.
Figure 9:
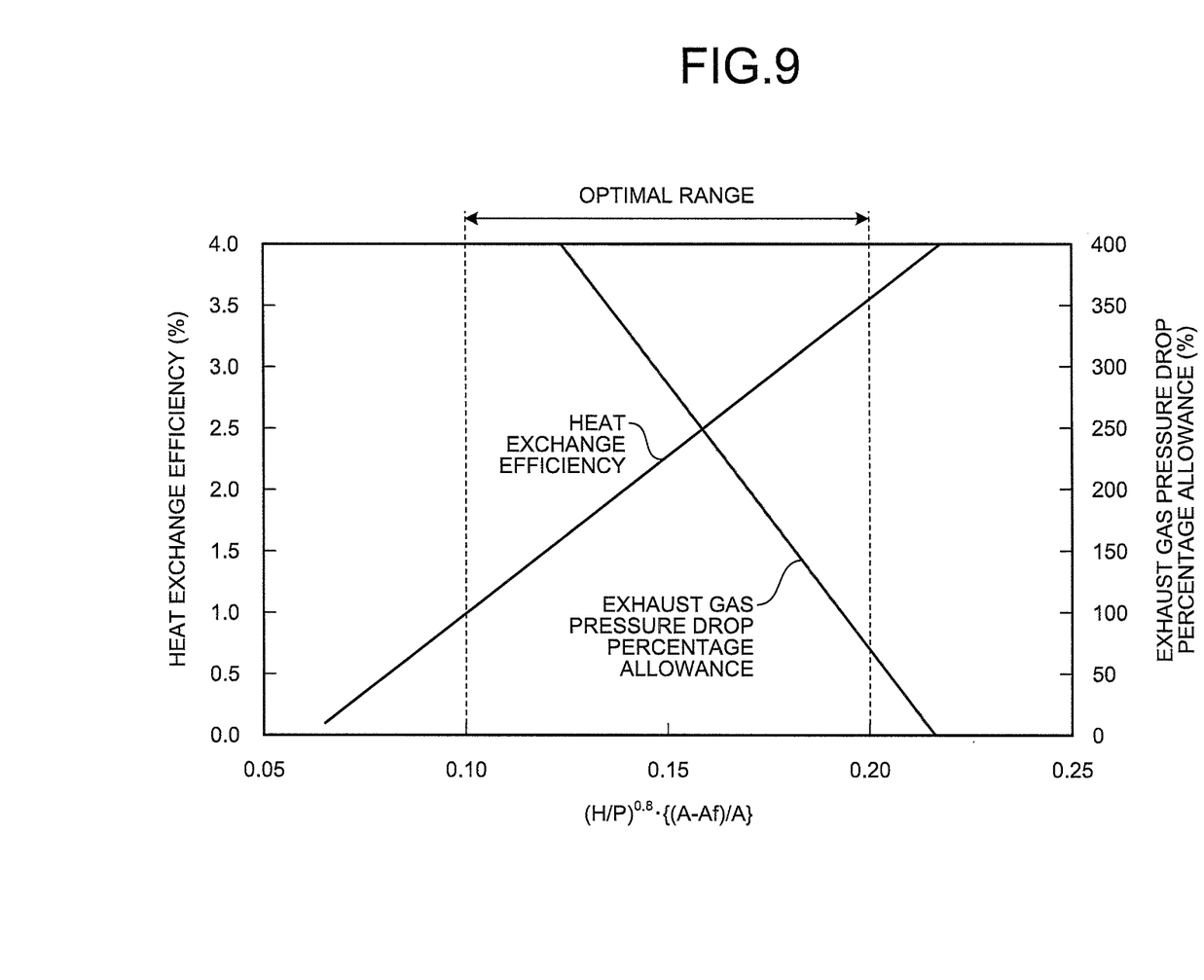
FIG. 9 is a graph illustrating the relationship of the dimension parameter of the fins with the heat exchange efficiency and the exhaust gas pressure drop percentage allowance.

FIG. 8 is an explanatory diagram for explaining the pitch and the height of the fins 14 in the heat exchanger 13 according to the present embodiment. FIG. 9 is a graph illustrating the relationship of the dimension parameter of the fins 14 with the heat exchange efficiency and the exhaust gas pressure drop percentage allowance. Meanwhile, in Table 1 is illustrated the relationship of the dimension parameter of the fins 14 with the heat exchange efficiency and the exhaust gas pressure drop percentage allowance.

In the heat exchanger 13 according to the embodiment, with reference to FIG. 8, when P represents the fin pitch representing the distance between the neighboring fins 14 along the heat exchanger main body axis direction, when H represents the fin height from the outer periphery of the heat exchanger main body 13a, when A represents the total heating area representing the total of the heating surface areas in which the heat exchanger main body 13a and the fins 14 can come into contact with the exhaust gas, and when Af represents the fin heating area representing the total of the heating surface areas in which the fins 14 can come into contact with the exhaust gas; a dimension parameter $(H/P)^{0.8} \cdot \{(A-Af)/A\}$ is configured to satisfy Equation (1) given below by referring to FIG. 9 and Table 1 and by taking into account the heat exchange efficiency and the exhaust gas pressure drop percentage allowance (described later).

$$0.10 \leq (H/P)^{0.8} \cdot \{(A-Af)/A\} \leq 0.20 \quad (1)$$

From Table 1, when the fin pitch P remains same, it can be understood that, higher the fin height H, the higher becomes the heat exchange efficiency. On the other hand, when the fin height H remains same, it can be understood that, shorter the fin pitch P, the higher becomes the heat exchange efficiency. Moreover, regardless of the length of the fin pitch P, it can be understood that, higher the fin height H, the smaller becomes the exhaust gas pressure drop percentage allowance. If the exhaust gas pressure drop percentage allowance becomes too small, in other words, if the pressure drop of the exhaust gas becomes too large; then it becomes difficult for the exhaust gas to flow in between the heat exchanger main body 13a, which has the fins 14 disposed on the outer periphery thereof, and the radiant tube 11. Hence, it is preferable to set the exhaust gas pressure drop percentage allowance to be equal to or greater than 100 [%]. Moreover, at the time, it is preferable to set the fin height H and the fin pitch P in such a way that the heat exchange efficiency is equal to or greater than 1.0 [%].

Since the dimension parameter of the fins 14 satisfies the relationship given above in Equation (1), the difference in thermal expansion between the fins 14 and the heat exchanger main body 13a can be reduced while maintaining a sufficient heat exchange efficiency and a sufficient exhaust gas pressure drop percentage allowance, and thus the fins 14 can be prevented from breakage.

In Table 2 is illustrated the relationship between the surface temperature and the production heat stress ratio of the heat exchanger main body 13a and the fins 14 in working examples 1 to 3 in which the dimension parameter of the fins 14 satisfies the relationship given earlier in Equation (1) and in a comparison example in which the dimension parameter of the fins 14 does not satisfy the relationship given earlier in Equation (1). In the working example 1, the condition "No. 2" specified in Table 1 is applied. In the working example 2, the condition "No. 5" specified in Table 1 is applied. In the working example 3, the condition "No. 3"

TABLE 1

| No. | H Fin height mm | P Fin pitch mm | Fin count | Fin heating area Af mm$^2$ | Total heating area A mm$^2$ | $(H/P)^{0.8} \cdot \{(A-Af)/A\}$ | Heat exchange efficiency % | Exhaust gas pressure drop percentage allowance % |
|---|---|---|---|---|---|---|---|---|
| 1 | 2 | 50 | 14 | 56620 | 403465 | 0.065 | 0.1 | 658.4 |
| 2 | 4 | 50 | 14 | 83172 | 430017 | 0.107 | 1.2 | 476.1 |
| 3 | 10 | 50 | 14 | 167048 | 513892 | 0.186 | 3.2 | 127.6 |
| 4 | 2 | 25 | 28 | 113241 | 453931 | 0.100 | 1.0 | 508.8 |
| 5 | 4 | 25 | 28 | 166345 | 507035 | 0.155 | 2.4 | 264.4 |
| 6 | 10 | 25 | 28 | 334096 | 674786 | 0.243 | 4.6 | −119.9 | specified in Table 1 is applied. In the comparison example, the condition "No. 1" specified in Table 1 is applied. Herein, the "production heat stress ratio" is related to the heat stress generated between the heat exchanger main body 13a and the fins 14. In the working examples 1 to 3 and in the comparison example, the difference in the surface temperature of the fins 14 and the heat exchanger main body 13a is obtained; and the production heat stress ratio is calculated as the ratio at the time when the difference in the surface temperature in the comparison example is treated as the reference (1.0).

TABLE 2

| | Surface temperature | | Production heat stress ratio |
|---|---|---|---|
| | Heat exchanger main body ° C. | Fin ° C. | |
| Comparison example | 800 | 1000 | 1.00 |
| Working example 1 | 805 | 1003 | 0.99 |
| Working example 2 | 810 | 1005 | 0.98 |
| Working example 3 | 815 | 1008 | 0.97 |

As illustrated in Table 2, in the working examples 1 to 3, the difference in the surface temperature between the fins 14 and the heat exchanger main body 13a is smaller as compared to the comparison example, and the production heat stress ratio too is smaller as compared to the comparison example. Hence, it can be understood that the heat stress occurring in between the heat exchanger main body 13a and the fins 14 can be reduced and the fins 14 can be prevented from breakage. Meanwhile, the surface temperature of the heat exchanger main body 13a and the fins 14 becomes higher in order of the working example 1, the working example 2, and the working example 3. That is because the turbulence flow promotion effect attributed to the fins 14 increases in order of the working example 1, the working example 2, and the working example 3; and the efficiency of heat transfer from the exhaust gas to the heat exchanger main body 13a and the fins 14 increases.

Figure 10:
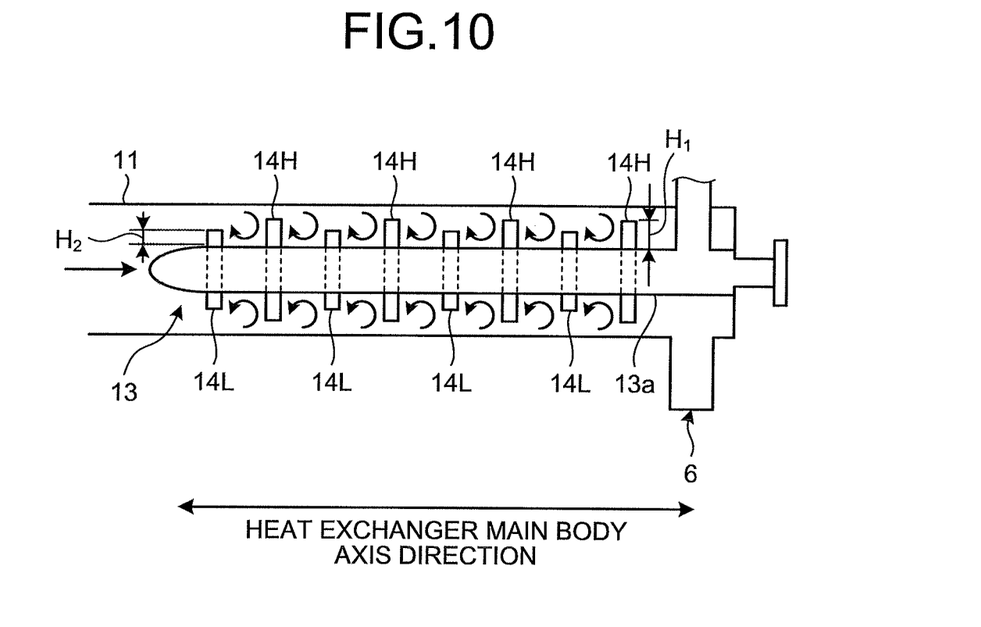
FIG. 10 is a diagram illustrating the state in which heat conductors are disposed in an uneven manner at a certain height in the heat exchanger main body axis direction on the outer periphery of the heat exchanger main body in the heat exchanger.

Meanwhile, in the present embodiment, as illustrated in FIG. 10, on the outer periphery of the heat exchanger main body 13a, the heat conductors can be disposed in an uneven manner at a certain height in the heat exchanger main body axis direction. For example, fins 14H having a fin height $H_1$ of 10 [mm] from the outer periphery of the heat exchanger main body 13a and fins 14L having a fin height $H_2$ of 5 [mm] from the outer periphery of the heat exchanger main body 13a are alternately disposed at predetermined intervals along the heat exchanger main body axis direction. As the fins 14H and 14L, for example, it is possible to use heat conductors made of a plurality of divided portions circular in shape and formed by division in the circumferential direction, or it is possible to use heat conductors made of circular members having one end thereof kept open. As a result, there is enhancement in the turbulence flow promotion effect attributed to the fins 14H and 14L, and the efficiency of heat transfer from the exhaust gas to the heat exchanger main body 13a and the fins 14H and 14L can be further enhanced.

Meanwhile, with respect to the heat exchanger 13 that has the fins 14 disposed on the outer periphery of the heat exchanger main body 13a as illustrated in FIG. 2, a heat conductors that are configured with a plurality of divided portions having circular shape and divided in the circumferential direction (for example, the fins 14) or heat conductors that are configured with a circular member having one end thereof kept open (for example, the fin 14A) can be additionally disposed. As a result, the heat conductors can be additionally attached to or can be removed from the heat exchanger main body 13a with ease. Hence, even after the heat exchanger 13 is disposed in the radiant tube type heating device 1, the heat exchange efficiency can be easily improved.

The heat exchanger 13 according to the present embodiment can be manufactured by installing the fins 14 or the fins 14A, which are either made of a plurality of divided portions circular in shape and formed by division in the circumferential direction or made of circular members having one end thereof kept open, on the outer periphery of the heat exchanger main body 13a that does not have any heat conductors disposed therein as illustrated in FIG. 3. As a result, the workability regarding the installation of heat conductors in the heat exchanger main body 13a can be substantially improved, and the heat exchanger 13 having a high heat transfer efficiency can be easily manufactured from the heat exchanger main body 13a not having any heat conductors disposed therein.

Alternatively, the heat exchanger 13 according to the present embodiment can be manufactured by installing the fins 14 or the fins 14A, which are either made of a plurality of divided portions circular in shape and formed by division in the circumferential direction or made of circular members having one end thereof kept open, on the outer periphery of the heat exchanger main body 13a that already has heat conductors disposed. As a result, it becomes easier to additionally dispose heat conductors in the heat exchanger main body 13a, and the heat exchanger 13 having higher heat transfer efficiency can be obtained.

Meanwhile, in the case of manufacturing the heat exchanger 13 according to the present embodiment by installing heat conductors such as the fins 14 or the fins 14A either on the outer periphery of the heat exchanger main body 13a not having any heat conductors disposed therein or on the outer periphery of the heat exchanger main body 13a having heat conductors disposed therein, the heat conductors can be disposed in an uneven manner at a certain height in the heat exchanger main body axis direction as described earlier. In this way, by keeping the height of the heat conductors uneven in the heat exchanger main body axis direction, the turbulence flow promotion effect is further enhanced and the heat transfer efficiency is enhanced, thereby enabling achieving enhancement in the heat exchange efficiency of the heat exchanger 13.

Herein, although the description is given about an embodiment of the present invention, the technical scope of the present invention is not limited to the present embodiment described above, and can be construed as embodying various deletions, alternative constructions, and modifications that may occur to one skilled in the art that fairly fall within the basic teaching herein set forth. For example, regarding the turbulence flow promoting members that promote the generation of the turbulence flow from the exhaust gas flowing in between the inner periphery of the radiant tube 11 and the outer periphery of the heat exchanger main body 13a, the turbulence flow promoting members can be disposed on the outer periphery as separate components different than the fins 14. Moreover, an embodiment of the present invention is implementable not only in a heat exchanger used in radiant tube type heating device of an annealing furnace meant for heating metallic strips, but can also be implemented in a heat exchanger used in a radiant tube type heating device of a heating furnace meant for other thermal treatment such as thermal treatment of inorganic materials.

INDUSTRIAL APPLICABILITY

According to embodiments of the present invention, it becomes possible to provide a heat exchanger, a radiant tube type heating device, and a method of manufacturing a heat exchanger that enable achieving reduction in the temperature difference between the main body of the heat exchanger and the heat conductors, and thus preventing breakage of the heat conductors.

REFERENCE SIGNS LIST 1 radiant tube type heating device
11 radiant tube
12 burner
13 heat exchanger
13a heat exchanger main body
14 fin
14a upper fin
14b lower fin
14A fin
14A1 one end
14H fin
14L fin
20A bolt
20B bolt
21A nut
21B nut
113 heat exchanger
113a heat exchanger main body
114 spiral fin

The invention claimed is:
1. A heat exchanger comprising:
a hollow heat exchanger main body that is enclosed in a radiant tube; and
a heat conductor that is disposed on an outer periphery of the heat exchanger main body,
wherein the heat exchanger performs heat exchange between a first gas flowing in between the radiant tube and the heat exchanger main body and a second gas flowing in a hollow interior of the heat exchanger main body,
wherein the heat conductor is configured to promote generation of a turbulence flow from the first gas flowing in between the radiant tube and the heat exchanger main body, the heat conductor being disposed on the outer periphery of the heat exchanger main body without welding,
wherein the heat conductor includes a plurality of circular heat conductors disposed at predetermined intervals in the heat exchanger main body axis direction,
wherein each of the circular heat conductors includes a plurality of divided portions that are able to be divided in a circumferential direction, and
wherein the relationship of $0.10 \leq (H/P)^{0.8} \cdot \{(A-Af)/A\} \leq 0.20$ is satisfied,
where P [mm] represents the distance between neighboring heat conductors along the heat exchanger main body axis direction, H [mm] represents the height of the heat conductors from the outer periphery, A [mm$^2$] represents total heating area of the heat exchanger main body and the heat conductors, and Af [mm$^2$] represents heating area of the heat conductors.
2. The heat exchanger according to claim 1, wherein a cross-section of each of the heat conductors parallel to the heat exchanger main body axis direction has a columnar shape, a flat shape, or a semicircular shape.
3. The heat exchanger according to claim 1, further comprising couplers configured to couple end portions in the circumferential direction of each of the plurality of divided portions adjustably, such that an amount of stress generated due to the contact between the heat conductor and the heat exchanger main body can be adjusted in advance of operation of the heat exchanger.
4. The heat exchanger according to claim 3, the couplers being selected from the group consisting of bolts, nuts, and clips.
5. The heat exchanger according to claim 1, wherein a height of the heat conductors from the outer periphery is smaller than a distance between neighboring heat conductors along the heat exchanger main body axis direction.
6. The heat exchanger according to claim 1, wherein the heat conductors are arranged to repeat an uneven pattern at a certain height in the heat exchanger main body axis direction.
7. The heat exchanger according to claim 1, wherein
the heat conductor includes circular members each having one end thereof kept open, the circular members being arranged at predetermined intervals along the heat exchanger main body axis direction.
8. The heat exchanger according to claim 1, further comprising an additional heat conductor including:
a plurality of divided portions that are divided in a circumferential direction; or
a circular member having one end thereof kept open.
9. The heat exchanger according to claim 1, wherein the heat conductor is made of a material having higher heat resistance than the heat exchanger main body.
10. A radiant tube heating device comprising a heat exchanging unit configured to perform heat exchange between a combustion gas, which is inserted in and flows inside a radiant tube, and combustion air used in heating the radiant tube, wherein
the heat exchanging unit is the heat exchanger according to claim 1.
11. A method of manufacturing a heat exchanger that performs heat exchange with combustion air by using exhaust gas of a burner attached to a radiant tube, the method comprising
disposing a heat conductor, for promoting heat exchange, on the outer periphery of a hollow heat exchanger main body, the heat conductor including:
a plurality of divided portions that are divided in a circumferential direction; or
a circular member having one end thereof kept open, and
wherein the relationship of $0.10 \leq (H/P)^{0.8} \cdot \{(A-Af)/A\} \leq 0.20$ is satisfied,
where P [mm] represents the distance between neighboring heat conductors along the heat exchanger main body axis direction, H [mm] represents the height of the heat conductors from the outer periphery, A [mm$^2$] represents total heating area of the heat exchanger main body and the heat conductors, and Af [mm$^2$] represents heating area of the heat conductors.
12. The method of manufacturing a heat exchanger according to claim 11, wherein the heat conductor is arranged to repeat an uneven pattern at a certain height in the heat exchanger main body axis direction.

13. The method of manufacturing a heat exchanger according to claim 11, wherein the heat conductor is made of a material having higher heat resistance than the heat exchanger main body.

14. A method of manufacturing a heat exchanger that performs heat exchange with combustion air using exhaust gas of a burner attached to a radiant tube, the method comprising
providing an additional heat conductor, for promoting heat exchange, on a heat exchanger main body in which a heat conductor for promoting heat exchange is disposed, the additional heat conductor including:
a plurality of divided portions that are divided in a circumferential direction; or
a circular member having one end thereof kept open, wherein the relationship of $0.10 \leq (H/P)^{0.8} \cdot \{(A-Af)/A\} \leq 0.20$ is satisfied,
where P [mm] represents the distance between neighboring heat conductors along the heat exchanger main body axis direction, H [mm] represents the height of the heat conductors from the outer periphery, A [mm$^2$] represents total heating area of the heat exchanger main body and the heat conductors, and Af [mm$^2$] represents heating area of the heat conductors.

15. The method of manufacturing a heat exchanger according to claim 14, wherein the heat conductor is arranged to repeat an uneven pattern at a certain height in the heat exchanger main body axis direction.

16. The method of manufacturing a heat exchanger according to claim 14, wherein the additional heat conductor is made of a material having higher heat resistance than the heat exchanger main body.

* * * * *